US012559620B2

(12) United States Patent
Pollum, Jr. et al.

(10) Patent No.: US 12,559,620 B2
(45) Date of Patent: Feb. 24, 2026

(54) CURABLE COATING COMPOSITIONS

(71) Applicant: PPG Industries Ohio, Inc., Cleveland, OH (US)

(72) Inventors: Marvin Michael Pollum, Jr., Pittsburgh, PA (US); Maria Santa French, Berkshire (GB); Daniel Patrick Willis, North Versailles, PA (US); Masayuki Nakajima, Wexford, PA (US); Loubna Pagnotti, Wexford, PA (US); David Joseph Fortman, Pittsburgh, PA (US); Joseph Peter Kriley, Valencia, PA (US); Hongying Zhou, Allison Park, PA (US); Kathrine Elizabeth Flood, San Jose, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 288 days.

(21) Appl. No.: 18/004,358

(22) PCT Filed: Jul. 7, 2021

(86) PCT No.: PCT/US2021/040620
§ 371 (c)(1),
(2) Date: Jan. 5, 2023

(87) PCT Pub. No.: WO2022/010972
PCT Pub. Date: Jan. 13, 2022

(65) Prior Publication Data

US 2023/0272209 A1 Aug. 31, 2023

Related U.S. Application Data

(60) Provisional application No. 63/048,804, filed on Jul. 7, 2020.

(51) Int. Cl.

| | |
|---|---|
| ***C08L 63/00*** | (2006.01) |
| ***C08G 18/10*** | (2006.01) |
| ***C08G 18/24*** | (2006.01) |
| ***C08G 18/28*** | (2006.01) |
| ***C08G 18/48*** | (2006.01) |
| ***C08G 59/40*** | (2006.01) |
| ***C08K 7/20*** | (2006.01) |
| ***C08L 27/16*** | (2006.01) |
| ***C09J 7/35*** | (2018.01) |
| ***C09J 163/00*** | (2006.01) |

(52) U.S. Cl.
CPC .............. *C08L 63/00* (2013.01); *C08G 18/10* (2013.01); *C08G 18/246* (2013.01); *C08G 18/2845* (2013.01); *C08G 18/4833* (2013.01); *C08G 59/4021* (2013.01); *C08K 7/20* (2013.01); *C08L 27/16* (2013.01); *C09J 7/35* (2018.01); *C09J 163/00* (2013.01); *C08G 2170/20* (2013.01); *C09J 2301/304* (2020.08); *C09J 2463/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,685,885 A * | 8/1954 | West | A45B 25/165 | 135/20.3 |
| 2,856,094 A * | 10/1958 | Gloyer | C09D 163/00 | 525/481 |
| 4,169,187 A * | 9/1979 | Glazar | C09D 163/00 | 427/195 |
| 4,179,542 A | 12/1979 | Christofas et al. | | |
| 5,686,509 A | 11/1997 | Nakayama et al. | | |
| 5,989,692 A | 11/1999 | Brown | | |
| 9,394,468 B2 | 7/2016 | Czaplicki et al. | | |
| 2004/0082699 A1* | 4/2004 | Brown | B01L 3/00 | 524/462 |
| 2004/0138083 A1* | 7/2004 | Kimbrell, Jr. | D06M 15/256 | 510/392 |
| 2009/0062477 A1* | 3/2009 | Cleaver | B29C 33/40 | 156/280 |
| 2013/0295388 A1 | 11/2013 | Du et al. | | |
| 2018/0298155 A1 | 10/2018 | Hosoda et al. | | |

FOREIGN PATENT DOCUMENTS

| | | |
|---|---|---|
| CN | 1225380 A | 8/1999 |
| CN | 1511906 A | 7/2004 |
| CN | 106893264 A | 6/2017 |
| CN | 107286585 A | 10/2017 |
| CN | 110951355 A | 4/2020 |

(Continued)

OTHER PUBLICATIONS

Epon Novolac resin TDS, Jul. 15, 2015 (Year: 2015).*

(Continued)

*Primary Examiner* — Peter A Salamon

(57) ABSTRACT

Disclosed herein are curable compositions comprising an epoxide-functional polymer, a curing agent capable of reacting with the epoxide-functional polymer that is activatable by an external energy source, and a fluoropolymer that is substantially free of a reactive functional group. The epoxide-functional polymer may be a solid epoxide-functional polyurethane comprising a di-isocyanate. Also disclosed are articles comprising one of the compositions in an at least partially cured state positioned between first and second substrates. Also disclosed are methods of forming an adhesive on a substrate.

19 Claims, No Drawings

(56) References Cited

FOREIGN PATENT DOCUMENTS

| | | | |
|---|---|---|---|
| EP | 3388501 | A1 | 10/2018 |
| JP | 2007106963 | A | 4/2007 |
| JP | 2014101448 | A | 6/2014 |
| JP | 2016166347 | A | 9/2016 |
| WO | 2004085550 | A2 | 10/2004 |
| WO | 2009120818 | A1 | 10/2009 |
| WO | 2014139426 | A1 | 9/2014 |
| WO | 2020191202 | A1 | 9/2020 |
| WO | 2020222897 | A1 | 11/2020 |
| WO | 2021011628 | A1 | 1/2021 |
| WO | 2021025756 | A1 | 2/2021 |
| WO | 2021211183 | A1 | 10/2021 |

OTHER PUBLICATIONS

Bisphenol A Diglycidyl Ether, Chemical Book, 2023 (Year: 2023).*

International Search Report and Written Opinion received for PCT Application Serial No. PCT/US2021/040620 dated Oct. 14, 2021, 15 pages.

* cited by examiner

CURABLE COATING COMPOSITIONS

FIELD OF THE INVENTION

The present invention relates to compositions, for example, curable compositions.

BACKGROUND OF THE INVENTION

Curable compositions are utilized in a wide variety of applications to treat a variety of substrates or to bond together two or more substrate materials.

The present invention is directed toward one-component compositions, including curable film compositions and reactive hot melt compositions that provide sufficient bond strength.

SUMMARY OF THE INVENTION

Disclosed herein are curable compositions, comprising: an epoxide-functional polymer; a curing agent capable of reacting with the epoxide-functional polymer that is activatable by an external energy source; and a fluoropolymer that is substantially free, or essentially free, or completely free, of a reactive functional group.

Also disclosed are structural adhesives formed by a curable coating composition of the present invention.

Also disclosed are articles comprising: a first substrate; and a structural adhesive formed by a curable coating composition of the present invention.

Also disclosed are methods of making a film or hot melt, comprising: heating a curable composition of the present invention to at least a melting point of the curable composition and below an activation temperature of the curing agent; casting the curable composition into a film or a mold to form a reactive hot melt; and cooling the casted curable composition to a temperature below the melting point of the curable composition.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached aspects are approximations that may vary depending upon the desired properties to be obtained by the present invention. At the very least, and not as an attempt to limit the application of the doctrine of equivalents to the scope of the aspects, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" epoxy and "a" curing agent, a combination (i.e., a plurality) of these components can be used.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a composition "applied onto" a substrate does not preclude the presence of one or more other intervening coating layers of the same or different composition located between the composition and the substrate.

As used herein, the term "green strength" means, following hot melt application, producing a load-bearing joint having a lap shear strength of at least 0.5 MPa as determined according to ASTM D1002-10 using 6022-T43 aluminum substrate of 0.89 mm thickness as measured by an INSTRON 5567 machine in tensile mode with a pull rate of 1.3 mm per minute.

As used herein, the term "hot melt application" means application of a curable coating composition of the present invention to a substrate surface under thermal conditions. As used herein, "thermal conditions" include (i) heat extrusion, (ii) heating of the coating composition to a temperature greater than the melting temperature of the coating composition and less than the curing temperature of the coating composition, and/or (iii) heating of the substrate comprising the coating composition to a temperature greater than the melting temperature of the coating composition and less than the curing temperature of the coating composition.

As used herein, the term "structural adhesive" means an adhesive composition that, in an at least partially dried or cured state, produces a load-bearing joint having a lap shear strength of greater than 15.0 MPa measured according to ASTM D1002-10 using 6022-T43 aluminum substrate of 0.89 mm thickness as measured by an INSTRON 5567 machine in tensile mode with a pull rate of 1.3 mm per minute.

As defined herein, a "1K" or "one-component" curable composition, is a composition in which all of the ingredients may be premixed and stored and wherein the reactive components do not readily react at ambient or slightly thermal conditions (e.g., up to 110° C.), but instead only react upon activation by an external energy source. In the absence of activation from the external energy source, the composition will remain largely unreacted (maintaining sufficient re-flow at elevated temperatures (e.g., greater than 30° C.) in the uncured state and greater than 70% of the initial lap shear strength of the composition in the cured state after storage at 25° C. for 6 months). External energy sources that may be used to activate the curing reaction (i.e., the crosslinking of the epoxide-functional polyurethane and the curing agent) include, for example, radiation (i.e., actinic radiation) and/or heat (e.g., exposure to temperature of greater than 110° C.). As used herein, the term "activate" means to convert to a reactive form and the term "activatable" means capable of being converted to a reactive form.

As used herein, the term "curing agent" means any reactive material that can be added to a composition to cure the composition. As used herein, the term "cure," "cured," or similar terms, means that the reactive functional groups of the components that form the composition react to form a film, layer, or bond. As used herein, the term "at least partially cured" means that at least a portion of the components that form the composition interact, react, and/or are crosslinked to form a film, layer, or bond. As used herein, "curing" of the curable composition refers to subjecting said composition to curing conditions leading to reaction of the reactive functional groups of the components of the composition and resulting in the crosslinking of the components of the composition and formation of an at least partially cured film, layer, or bond. As used herein, a "curable" composition refers to a composition that may be cured. In the case of a 1K composition, the composition is at least partially cured or cured when the composition is subjected to curing conditions that lead to the reaction of the reactive functional groups of the components of the composition, such as elevated temperature, lowered activation energy through catalytic activity, radiation, etc. A curable composition may be considered to be "at least partially cured" if it has a lap shear strength of at least 1 MPa (measured according to ASTM D1002-10) following exposure to thermal conditions greater than the hot melt application temperature. The curable composition may also be subjected to curing conditions such that a substantially complete cure is attained and wherein further curing results in no significant further improvement in the coating properties such as, for example, increased lap shear performance.

As used herein, the term "accelerator" means a substance that increases the rate or decreases the activation energy of a chemical reaction. An accelerator may be either a "catalyst," that is, without itself undergoing any permanent chemical change, or may be reactive, that is, capable of chemical reactions and includes any level of reaction from partial to complete reaction of a reactant.

As used herein, the terms "latent" or "blocked" or "encapsulated", when used with respect to a curing agent or an accelerator, means a molecule or a compound that is activated by an external energy source prior to reacting (i.e., crosslinking) or having a catalytic effect, as the case may be. For example, an accelerator may be in the form of a solid at room temperature and have no catalytic effect until it is heated and melts or dissolves in the composition, or the latent accelerator may be reversibly reacted with a second compound that prevents any catalytic effect until the reversible reaction is reversed by the application of heat and the second compound is removed, freeing the accelerator to catalyze reactions.

As further defined herein, ambient conditions generally refer to room temperature and humidity conditions or temperature and humidity conditions that are typically found in the area in which the adhesive is being applied to a substrate, e.g., at 10° C. to 40° C. and 5% to 80% relative humidity, such as, e.g., 25° C. and 50% humidity.

As used herein, "Mw" refers to the weight average molecular weight and means the theoretical value as determined by Gel Permeation Chromatography using Waters 2695 separation module with a Waters 410 differential refractometer (RI detector), polystyrene standards, using tetrahydrofuran (THF) used as the eluent at a flow rate of 1 ml $min^{-1}$ and two PL Gel Mixed C columns for separation.

As used herein, "Mn" refers to the number average molecular weight and means the theoretical value as determined by Gel Permeation Chromatography using Waters 2695 separation module with a Waters 410 differential refractometer (RI detector), polystyrene standards, using tetrahydrofuran (THF) used as the eluent at a flow rate of 1 ml $min^{-1}$ and two PL Gel Mixed C columns for separation.

As used herein, unless indicated otherwise, the term "substantially free" means that a particular material is not purposefully added to a mixture or composition, respectively, and is only present as an impurity in a trace amount of less than 5% by weight based on a total weight of the mixture or composition, respectively. As used herein, unless indicated otherwise, the term "essentially free" means that a particular material is only present in an amount of less than 2% by weight based on a total weight of the mixture or composition, respectively. As used herein, unless indicated otherwise, the term "completely free" means that a mixture or composition, respectively, does not comprise a particular material, i.e., the mixture or composition comprises 0% by weight of such material.

As used herein, the term "solid" refers to a material that has a viscosity of at least 9,000,000 cP at 25° C. as determined by heating the material to 100° C. and measuring shear stress at a shear rate of 0.1 $s^{-1}$ while reducing the temperature from 100° C. to 25° C. at a rate of 5° C./min using an Anton Paar Physica MCR 301 Rheometer with a 25 mm diameter parallel plate spindle (0.5 mm gap).

As used herein, the term "liquid" refers to a material that has a viscosity of less than 9,000,000 cP at 25° C. as determined by heating the material to 100° C. and measuring shear stress at a shear rate of 0.1 $s^{-1}$ while reducing the temperature from 100° C. to 25° C. at a rate of 5° C./min using an Anton Paar Physica MCR 301 Rheometer with a 25 mm diameter parallel plate spindle (0.5 mm gap).

As used herein, the term "melting point" refers to the temperature at which a compound or composition undergoes an endothermic phase transition from an at least semi-crystalline solid state to a liquid state.

As used herein, the term "film" refers to a layer formed by the curable compositions of the present invention in an uncured state and/or an at least partially cured state and which optionally may be positioned on a supporting medium such as nylon or glass fiber, wherein the supporting medium may be positioned between a substrate surface and the film or may be embedded in the curable composition.

As used herein, the term "reactive hot melt" or "reactive hot melt composition" refers to a curable composition comprising at least two co-reactive components and which is a solid at temperatures less than 30° C. and which melts to a liquid when heated, and, upon cooling, returns to a solid state.

As stated above, the present invention is directed to a curable composition, such as a structural adhesive, comprising, or consisting essentially of, or consisting of, an epoxide-containing component, a curing agent capable of reacting with the epoxide-containing component, wherein the curing agent may be activatable by an external energy source, and a fluoropolymer that is substantially free, or essentially free, or completely free, of a reactive functional group.

As described in more detail below, the epoxide-containing component may comprise, or consist essentially of, or consist of, an epoxide-functional polymer.

The epoxide-functional polymer may comprise an epoxide-functional polyurethane or an epoxide-functional polyurea. The epoxide-functional polymer may comprise a solid at temperatures less than 30° C. In examples, the epoxide-functional polymer may have a viscosity of at least 9,000,000 cP at 25° C. as determined by heating the epoxide-functional polymer to 100° C. and measuring shear stress at a shear rate of 0.1 $s^{-1}$ while reducing the temperature from 100° C. to 25° C. at a rate of 5° C./min using an Anton Paar Physica MCR 301 Rheometer with a 25 mm diameter parallel plate spindle (0.5 mm gap), such as more than 20,000,000 cP, such as more than 30,000,000 cP. The epoxide-functional polymer may be semi-crystalline or crystalline and may exhibit an endothermic melt transition beginning at a temperature of 30° C., such as 35° C., such as 40° C.

The epoxide-functional polymer may have a melting point that is at least 10° C. lower than a temperature at which the curing agent is activated, such as at least 20° C. lower, such as at least 30° C. lower, such as at least 40° C. lower, such as at least 50° C. lower. The epoxide-functional polymer may comprise an epoxide-functional polyurethane or an epoxide-functional polyurea.

The epoxide-functional polyurethane or epoxide-functional polyurea may have Structure I:

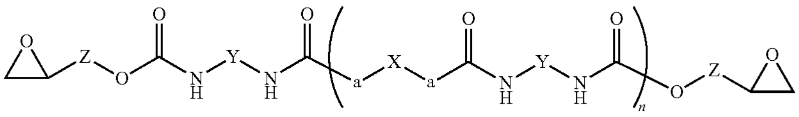

wherein: a=independently O or NR and where R=H or $C_1$-$C_{18}$; X=a polyether, polythioether, polybutadiene, polyester, or polyurethane; Y=$C_1$-$C_{20}$ linear, cyclic, aliphatic, and/or aromatic polyisocyanate derivative; Z=$C_1$-$C_{12}$, linear, cyclic, aromatic, aliphatic, and/or phenolic; and n≥1. In examples, X may have a weight average molecular weight of no more than 1000 g/mol as measured by Gel Permeation Chromatography using a Waters 2695 separation module with a Waters 410 differential refractometer (RI detector), linear polystyrene standards having molecular weights of 580 Da to 365,000 Da, tetrahydrofuran (THF) as the eluent at a flow rate of 1 mL/min, and two Agilent PL Gel Mixed-C column (300×7.5 mm, 5 μm) for separation, such as a weight average molecular weight of no more than 650 g/mol, and may have a weight average molecular weight of at least 100 g/mol. In examples, X may have a weight average molecular weight of 100 g/mol to 1000 g/mol as measured by Gel Permeation Chromatography using a Waters 2695 separation module with a Waters 410 differential refractometer (RI detector), linear polystyrene standards having molecular weights of 580 Da to 365,000 Da, tetrahydrofuran (THF) as the eluent at a flow rate of 1 mL/min, and two Agilent PL Gel Mixed-C column (300×7.5 mm, 5 μm) for separation, such as 250 g/mol to 650 g/mol.

The epoxide-functional polymer may be substantially free, or essentially free, or completely free, of unreacted isocyanate functional groups. As used herein, the term "substantially free," "essentially free," or "completely free," when used with respect to the absence of unreacted isocyanate functional groups on the epoxide-functional polymer, means that the unreacted isocyanate functional group is present in an amount of 1% or less, 0.1% or less, or 0.00% or less, respectively, the percentage based upon the total weight of isocyanate functional groups relative to total weight of the composition.

The epoxide-functional polymer may comprise a reaction product of an isocyanate-functional prepolymer and an epoxide-functional compound. For example, the isocyanate-functional prepolymer may be formed by reacting a polyol with a polyisocyanate. In other examples, the isocyanate-functional prepolymer may be formed by reacting a polyamine with a polyisocyanate.

Suitable polyols useful in forming the isocyanate-functional prepolymer of the present invention include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used. Elastomeric particles (described below) may be pre-dispersed or dispersed in such polyols as a carrier resin, such as in polypropylene glycol (commercially available as Kane Ace MX-710 and Kane Ace MX-714, for example).

The polyol may comprise a polycaprolactone-based polyol. The polycaprolactone-based polyols may comprise diols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

In examples, the polyol may have a calculated average molecular weight (Mn) of at least 40 g/mol, such as at least 70 g/mol, and may have a calculated average molecular weight (Mn) of no more than 1000 g/mol, such as no more than to 750 g/mol. The polyol may have a calculated average molecular weight (Mn) of 40 g/mol to 1000 g/mol, such as 70 g/mol to 750 g/mol.

Suitable polyamines useful in forming the isocyanate-functional prepolymer of the present invention can be selected from a wide variety of known amines such as primary and secondary amines, and mixtures thereof. The amine may include monoamines, or polyamines having at least two amine hydrogens. Polyamines may be di-functional amines, and mixtures thereof. The amine may be aromatic or aliphatic such as cycloaliphatic, or mixtures thereof. Non-limiting examples of suitable amines may include aliphatic polyamines such as but not limited to ethylamine, isomeric propylamines, butylamines, pentylamines, hexylamines, cyclohexylamine, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluoylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

Non-limiting examples of secondary amines can include mono- and poly-acrylate and methacrylate modified amines; polyaspartic esters which can include derivatives of compounds such as maleic acid, fumaric acid esters, aliphatic polyamines and the like; and mixtures thereof. The secondary amine may include an aliphatic amine, such as a cycloaliphatic diamine. Such amines are available commercially from Huntsman Corporation (Houston, Tex.) under the designation of JEFFLINK such as JEFFLINK 754.

The amine can include an amine-functional resin. Suitable amine-functional resins can be selected from a wide variety known in the art. The amine-functional resin may be an ester of an organic acid, for example, an aspartic ester-based amine-functional reactive resin that is compatible with isocyanate. The isocyanate may be substantially free, or essentially free, or completely free, of solvent, and/or has a mole ratio of amine-functionality to the ester of no more than 1:1 so that no excess primary amine remains upon reaction. A non-limiting example of such polyaspartic esters may include the derivative of diethyl maleate and 1,5-diamino-2-methylpentane, which is available commercially from Covestro under the trade name DESMOPHEN NH1220. Other suitable compounds containing aspartate groups may be employed as well.

The amine may include higher molecular weight primary amine, such as but not limited to polyoxyalkyleneamine. Suitable polyoxyalkyleneamines may contain two or more primary amino groups attached to a backbone derived, for example, from propylene oxide, ethylene oxide, or mixtures thereof. Non-limiting examples of such amines may include those available under the designation JEFFAMINE® or ELASTAMINE® from Huntsman Corporation. Such amines may have an Mn of 150 to 7500, such as but not limited to JEFFAMINE® D-230, D-400, XTJ-616, and ED600, and ELASTAMINE® RP-405, RP-409, RE-600, HE-150, and RP3-400. Other suitable amines include aliphatic and cycloaliphatic polyamines such as the Ancamine® series available from Evonik.

In examples, the polyamine may have a calculated molecular weight of at least 40 g/mol, such as at least 70 g/mol, and may have a calculated molecular weight of no more than 2000 g/mol, such as no more than 750 g/mol. The polyamine may have a calculated molecular weight of 40 g/mol to 2000 g/mol, such as 70 g/mol to 750 g/mol.

Suitable polyisocyanates useful in forming the isocyanate-functional prepolymer of the present invention can be polymeric containing two or more isocyanate functional groups (NCOs). For example, the polyisocyanate may comprise $C_1$-$C_{20}$ linear, cyclic, aliphatic and/or aromatic polyisocyanates, or mixtures thereof.

Aliphatic polyisocyanates may include (i) alkylene isocyanates, such as: trimethylene diisocyanate; tetramethylene diisocyanate, such as 1,4-tetramethylene diisocyanate; pentamethylene diisocyanate, such as 1,5-pentamethylene diisocyanate and 2-methyl-1,5-pentamethylene diisocyanate; hexamethylene diisocyanate ("HDI"), such as 1,6-hexamethylene diisocyanate and 2,2,4- and 2,4,4-trimethylhexamethylene diisocyanate, or mixtures thereof; heptamethylene diisocyanate, such as 1,7-heptamethylene diisocyanate; propylene diisocyanate, such as 1,2-propylene diisocyanate; butylene diisocyanate, such as 1,2-butylene diisocyanate, 2,3-butylene diisocyanate, 1,3-butylene diisocyanate, and 1,4-butylene diisocyanate; ethylene diisocyanate; decamethylene diisocyanate, such as 1,10-decamethylene diisocyanate; ethylidene diisocyanate; and butylidene diisocyanate. Aliphatic polyisocyanates may also include (ii) cycloalkylene isocyanates, such as: cyclopentane diisocyanate, such as 1,3-cyclopentane diisocyanate; cyclohexane diisocyanate, such as 1,4-cyclohexane diisocyanate, 1,2-cyclohexane diisocyanate, isophorone diisocyanate ("IPDI"), methylene bis(4-cyclohexylisocyanate) ("HMDI"); and mixed aralkyl diisocyanates such as tetramethylxylyl diisocyanates, such as meta-tetramethylxylylene diisocyanate (commercially available as TMXDI® from Allnex SA).

Aromatic polyisocyanates may include (i) arylene isocyanates, such as: phenylene diisocyanate, such as m-phenylene diisocyanate, p-phenylene diisocyanate, and chlorophenylene 2,4-diisocyanate; naphthalene diisocyanate, such as 1,5-naphthalene diisocyanate and 1,4-naphthalene diisocyanate. Aromatic polyisocyanates may also include (ii) alkarylene isocyanates, such as: methylene-interrupted aromatic diisocyanates, such as 4,4'-diphenylene methane diisocyanate ("MDI"), and alkylated analogs such as 3,3'-dimethyl-4,4'-diphenylmethane diisocyanate, and polymeric methylenediphenyl diisocyanate; toluene diisocyante ("TDI"), such as 2,4-tolylene or 2,6-tolylene diisocyanate, or mixtures thereof, bitoluene diisocyanate; and 4,4-toluidine diisocyanate; xylene diisocyanate; dianisidine diisocyanate; xylylene diisocyanate; and other alkylated benzene diisocyanates.

The isocyanate compound may have at least one functional group that is different from the isocyanate functional group(s), such as sites of ethylenic unsaturation.

As discussed above, the epoxide-functional polyurethane or epoxide-functional polyurea may comprise a reaction product of an isocyanate-functional prepolymer (described above) and an epoxide functional compound.

Suitable epoxide functional compounds that may be used include monoepoxides, polyepoxides, or combinations thereof.

Suitable monoepoxides that may be used include monoglycidyl ethers of alcohols and phenols, such as phenyl glycidyl ether, n-butyl glycidyl ether, cresyl glycidyl ether, isopropyl glycidyl ether, glycidyl versatate, for example, CARDURA E available from Shell Chemical Co., and glycidyl esters of monocarboxylic acids such as glycidyl neodecanoate, and mixtures of any of the foregoing.

Useful epoxide functional components that can be used include polyepoxides (having an epoxide functionality greater than 1), epoxide-functional adducts, or combinations thereof. Suitable polyepoxides include polyglycidyl ethers of Bisphenol A, such as Epon® 828 and 1001 epoxy resins, and Bisphenol F polyepoxides, such as Epon® 863, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting epoxy compounds include epoxidized Bisphenol A novolacs, epoxidized phenolic novolacs, epoxidized cresylic novolac, isosorbide diglycidyl ether, triglycidyl p-aminophenol, and triglycidyl p-aminophenol bismaleimide, triglycidyl isocyanurate, tetraglycidyl 4,4'-diaminodiphenylmethane, and tetraglycidyl 4,4'-diaminodiphenylsulphone. The epoxide functional compound may also comprise an epoxy-dimer acid adduct. The epoxy-dimer acid adduct may be formed as the reaction product of reactants comprising a diepoxide compound (such as a polyglycidyl ether of Bisphenol A) and a dimer acid (such as a C36 dimer acid). The epoxy-containing compound may also comprise a carboxyl-terminated butadiene-acrylonitrile copolymer modified epoxy-containing compound. The epoxy-containing compound may also comprise epoxidized castor oil. The epoxy-containing compound may also comprise an epoxy-containing acrylic, such as glycidyl methacrylate. Elastomeric particles (described below) may be pre-dispersed or dispersed in such epoxide-functional components as a carrier resin, such as bisphenol A diglycidyl ether or bisphenol F diglycidyl ether (commercially available as Kane Ace MX-153 and Kane Ace MX-135, respectively, for example).

The epoxy-containing compound may comprise an epoxy-adduct. The composition may comprise one or more epoxy-adducts. As used herein, the term "epoxy-adduct" refers to a reaction product comprising the residue of an epoxy compound and at least one other compound that does not include an epoxide functional group. For example, the epoxy-adduct may comprise the reaction product of reactants comprising: (1) an epoxy compound, a polyol, and an anhydride; (2) an epoxy compound, a polyol, and a diacid; or (3) an epoxy compound, a polyol, an anhydride, and a diacid.

The epoxy compound used to form the epoxy-adduct may comprise any of the epoxy-containing compounds listed above that may be included in the composition.

The polyol used to form the epoxy-adduct may include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the diacids and anhydrides.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, and Capa 2205.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

The anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexafluoroisopropylidene) anhydride (6FDA).

The diacid used to form the epoxy-adduct may comprise any suitable diacid known in the art. For example, the diacids may comprise phthalic acid and its derivates (e.g., methyl phthalic acid), hexahydrophthalic acid and its derivatives (e.g., methyl hexahydrophthalic acid), maleic acid, succinic acid, adipic acid, and the like.

The epoxy-adduct may comprise a diol, a monoanhydride or a diacid, and a diepoxy compound, wherein the mole ratio of diol, monoanhydride (or diacid), and diepoxy compounds in the epoxy-adduct may vary from 0.5:0.8:1.0 to 0.5:1.0:6.0.

The epoxy-adduct may comprise a triol, a monoanhydride or a diacid, and a diepoxy compound, wherein the mole ratio of triol, monoanhydride (or diacid), and diepoxy compounds in the epoxy-adduct may vary from 0.5:0.8:1.0 to 0.5:1.0:6.0.

The epoxy-adduct may comprise a tetraol, a monoanhydride or a diacid, and a diepoxy compound, wherein the mole ratio of tetraol, monoanhydride (or diacid), and diepoxy compounds in the epoxy-adduct may vary from 0.5:0.8:1.0 to 0.5:1.0:6.0.

Other suitable epoxy-containing components include epoxy-adducts such as epoxy polyesters formed as the reaction product of reactants comprising an epoxy-containing compound, a polyol and an anhydride, as described in U.S. Pat. No. 8,796,361, col. 3, line 42 through col. 4, line 65, the cited portion of which is incorporated herein by reference.

In one embodiment, the epoxy-adduct is formed as the reaction product of reactants comprising a first epoxy compound, a polyol, and an anhydride. In another embodiment, the epoxy-adduct is formed as the reaction product of reactants comprising a first epoxy compound, a polyol, and a diacid. In still another embodiment, the epoxy-adduct is formed as the reaction product of reactants comprising a first epoxy compound, a polyol, an anhydride, and a diacid.

Useful first epoxy compounds that can be used to form the epoxy-adduct include polyepoxides. Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting first epoxy compounds include epoxidized Bisphenol A novolacs, epoxidized phenolic novolacs, epoxidized cresylic novolac, and triglycidyl p-aminophenol bismaleimide.

Useful polyols that may be used to form the epoxy-adduct include diols, triols, tetraols and higher functional polyols. The polyols can be based on a polyether chain derived from ethylene glycol, propylene glycol, butylenes glycol, hexylene glycol and the like and mixtures thereof. The polyol can also be based on a polyester chain derived from ring opening polymerization of caprolactone. Suitable polyols may also include polyether polyol, polyurethane polyol, polyurea polyol, acrylic polyol, polyester polyol, polybutadiene polyol, hydrogenated polybutadiene polyol, polycarbonate polyols, polysiloxane polyol, and combinations thereof. Polyamines corresponding to polyols can also be used, and in this case, amides instead of carboxylic esters will be formed with acids and anhydrides.

Suitable diols that may be utilized to form the epoxy-adduct are diols having a hydroxyl equivalent weight of between 30 and 1000. Exemplary diols having a hydroxyl equivalent weight from 30 to 1000 include diols sold under the trade name Terathane®, including Terathane® 250, available from Invista. Other exemplary diols having a hydroxyl equivalent weight from 30 to 1000 include ethylene glycol and its polyether diols, propylene glycol and its polyether diols, butylenes glycol and its polyether diols, hexylene glycols and its polyether diols, polyester diols synthesized by ring opening polymerization of caprolactone, and urethane diols synthesized by reaction of cyclic carbonates with diamines. Combination of these diols and polyether diols derived from combination various diols described above could also be used. Dimer diols may also be used including those sold under trade names Pripol® and Solvermol™ available from Cognis Corporation.

Polytetrahydrofuran-based polyols sold under the trade name Terathane®, including Terathane® 650, available from Invista, may be used. In addition, polyols based on dimer diols sold under the trade names Pripol® and Empol®, available from Cognis Corporation, or bio-based polyols, such as the tetrafunctional polyol Agrol 4.0, available from BioBased Technologies, may also be utilized.

Useful anhydride compounds to functionalize the polyol with acid groups include hexahydrophthalic anhydride and its derivatives (e.g. methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexamfluoroisopropylidene) anhydride (6FDA).

Useful diacid compounds to functionalize the polyol with acid groups include phthalic acid and its derivates (e.g., methyl phthalic acid), hexahydrophthalic acid and its derivatives (e.g., methyl hexahydrophthalic acid), maleic acid, succinic acid, adipic acid, etc.

The epoxy-containing component may have an average epoxide functionality of greater than 1.0, such as at least 1.8, and may have an average epoxide functionality of no more than 4.0, such as no more than 2.8. The epoxy-containing component may have an average epoxide functionality of greater than 1.0 to 4.0, such as 1.8 to 2.8. As used herein, the term “average epoxide functionality” means the molar ratio of epoxide functional groups to epoxide-containing molecules in the composition.

According to the present invention, the epoxide-functional polymer may be present in the composition in an amount of at least 20 percent by weight based on the total composition weight, such as at least 45 percent by weight, and in some cases may be present in the curable composition in an amount of no more than 98 percent by weight based on the total composition weight, such as no more than 75 percent by weight. According to the present invention, the epoxide-functional polymer may be present in the curable composition in an amount of from 20 percent by weight to 98 percent by weight based on total weight of the composition, such as 45 percent by weight to 75 percent by weight.

According to the present invention, the epoxy equivalent weight of the epoxide-functional polymer of the curable composition may be at least 100 g/eq, such as at least 160 g/eq, such as at least 200 g/eq, and in some cases may be no more than 5,000 g/eq, such as no more than 3,000 g/eq, such as no more than 2,000 g/eq, such as no more than 1,500 g/eq. According to the present invention, the epoxy equivalent weight of the epoxide-functional polymer of the curable composition can range from 100 g/eq to 5,000 g/eq, such as from 160 g/eq to 3,000 g/eq, such as from 200 g/eq to 2,000 g/eq, such as from 200 g/eq to 1,500 g/eq. As used herein, the “epoxy equivalent weight” is determined by dividing the average molecular weight of the epoxy-containing component by the average number of epoxy groups present in the epoxide-functional polymer per molecule.

According to the present invention, the molecular weight (Mw) of the epoxide-containing polymer of the curable composition may be at least 40 g/mol, such as at least 150 g/mol, such as at least 300 g/mol, such as at least 500 g/mol, such as at least 1,000 g/mol, and in some cases no more than 20,000 g/mol, such as no more than 10,000 g/mol, such as no more than 7,000 g/mol, such as no more than 5,000 g/mol. According to the present invention, the Mw of the epoxide-containing polymer of the curable composition can range from 40 g/mol to 20,000 g/mol, such as from 150 g/mol to 10,000 g/mol, such as from 300 g/mol to 7,000 g/mol, such as from 500 g/mol to 5,000 g/mol.

The composition of the present invention further comprises a curing agent activatable by an external energy source. Suitable curing agents useful in the present invention include one or more guanidines and/or one or more melamines.

It will be understood that “guanidine,” as used herein, refers to guanidine and derivatives thereof. For example, the curing component that may be used includes guanidines, substituted guanidines, substituted ureas, melamine resins, guanamine derivatives, and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide, e.g., Dyhard® available from AlzChem). Representatives of suitable guanamine derivatives which may be mentioned are alkylated benzoguanamine resins, benzoguanamine resins or methoxymethylethoxymethylbenzoguanamine.

For example, the guanidine may comprise a compound, moiety, and/or residue having the following general structure:

(II)

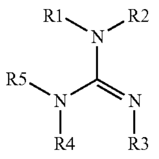

wherein each of R1, R2, R3, R4, and R5 (i.e., substituents of structure (II)) comprise hydrogen, (cyclo)alkyl, aryl, aromatic, organometallic, a polymeric structure, or together can form a cycloalkyl, aryl, or an aromatic structure, and wherein R1, R2, R3, R4, and R5 may be the same or different. As used herein, "(cyclo)alkyl" refers to both alkyl and cycloalkyl. When any of the R groups "together can form a (cyclo)alkyl, aryl, and/or aromatic group", it is meant that any two adjacent R groups are connected to form a cyclic moiety, such as the rings in structures (III)-(VI) below.

It will be appreciated that the double bond between the carbon atom and the nitrogen atom that is depicted in structure (II) may be located between the carbon atom and another nitrogen atom of structure (II). Accordingly, the various substituents of structure (II) may be attached to different nitrogen atoms depending on where the double bond is located within the structure.

The guanidine may comprise a cyclic guanidine such as a guanidine of structure (I) wherein two or more R groups of structure (II) together form one or more rings. In other words, the cyclic guanidine may comprise ≥1 ring(s). For example, the cyclic guanidine may either be a monocyclic guanidine (1 ring) such as depicted in structures (III) and (IV) below, or the cyclic guanidine may be bicyclic or polycyclic guanidine (≥2 rings) such as depicted in structures (V) and (VI) below.

(III)

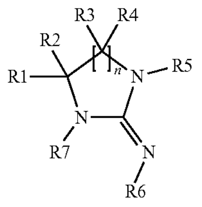

(IV)

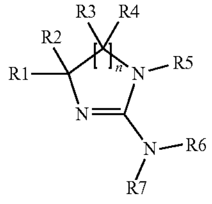

-continued (V)

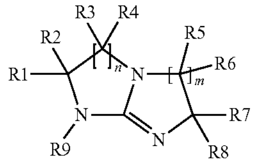

(VI)

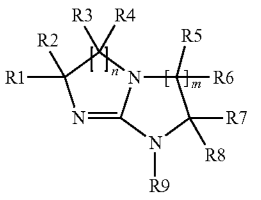

Each substituent of structures (III) and/or (IV), R1-R7, may comprise hydrogen, (cyclo)alkyl, aryl, aromatic, organometallic, a polymeric structure, or together can form a cycloalkyl, aryl, or an aromatic structure, and wherein R1-R7 may be the same or different. Similarly, each substituent of structures (V) and (VI), R1-R9, may be hydrogen, alkyl, aryl, aromatic, organometallic, a polymeric structure, or together can form a cycloalkyl, aryl, or an aromatic structure, and wherein R1-R9 may be the same or different. Moreover, in some examples of structures (III) and/or (IV), certain combinations of R1-R7 may be part of the same ring structure. For example, R1 and R7 of structure (III) may form part of a single ring structure. Moreover, it will be understood that any combination of substituents (R1-R7 of structures (III) and/or (IV) as well as R1-R9 of structures (V) and/or (VI)) may be chosen so long as the substituents do not substantially interfere with the catalytic activity of the cyclic guanidine.

Each ring in the cyclic guanidine may be comprised of ≥5 members. For example, the cyclic guanidine may comprise a 5-member ring, a 6-member ring, and/or a 7-member ring. As used herein, the term "member" refers to an atom located in a ring structure. Accordingly, a 5-member ring will have 5 atoms in the ring structure ("n" and/or "m"=1 in structures (III)-(VI)), a 6-member ring will have 6 atoms in the ring structure ("n" and/or "m"=2 in structures (III)-(VI)), and a 7-member ring will have 7 atoms in the ring structure ("n" and/or "m"=3 in structures (III)-(VI)). It will be appreciated that if the cyclic guanidine is comprised of ≥2 rings (e.g., structures (V) and (VI)), the number of members in each ring of the cyclic guanidine can either be the same or different. For example, one ring may be a 5-member ring while the other ring may be a 6-member ring. If the cyclic guanidine is comprised of ≥3 rings, then in addition to the combinations cited in the preceding sentence, the number of members in a first ring of the cyclic guanidine may be different from the number of members in any other ring of the cyclic guanidine.

It will also be understood that the nitrogen atoms of structures (III)-(VI) may further have additional atoms attached thereto. Moreover, the cyclic guanidine may either be substituted or unsubstituted. For example, as used herein in conjunction with the cyclic guanidine, the term "substituted" refers to a cyclic guanidine wherein R5, R6, and/or R7 of structures (III) and/or (IV) and/or R9 of structures (V) and/or (VI) is not hydrogen. As used herein in conjunction with the cyclic guanidine, the term "unsubstituted" refers to a cyclic guanidine wherein R1-R7 of structures (III) and/or (IV) and/or R1-R9 of structures (V) and/or (VI) are hydrogen.

The cyclic guanidine may comprise a bicyclic guanidine, and the bicyclic guanidine may comprise 1,5,7-triazabicyclo [4.4.0]dec-5-ene ("TBD" or "BCG").

As discussed above, suitable curing agents useful in the present invention also include one or more melamines. Examples of melamines that may be used in the present invention include alkoxylated melamine-formaldehyde or paraformaldehyde condensation products, for example condensation products from an alkoxylated melamine-formaldehyde such as methoxymethylolmelamine, isobutoxymethylolmelamine or n-butoxymethylolmelamine, as well as such commercial products available under the brand name Cymel®, Cyrez®, or Setamine®.

The curing agent may be present in the curable composition in an amount of at least 1 percent by weight based on total weight of the curable composition, such as at least 2 percent by weight, and may be present in an amount of no more than 30 percent by weight based on total weight of the curable composition, such as no more than 14 percent by weight. The curing agent may be present in the curable composition in an amount of 1 percent by weight to 30 percent by weight based on total weight of the curable composition, such as 2 percent by weight to 14 percent by weight.

The curable composition of the present invention may further comprise a fluoropolymer. In an example, the fluoropolymer may comprise a homopolymer and may be substantially free, or essentially free, or completely free, of reactive functional groups. As used herein, a "reactive functional group" means a pendant and/or terminal atom or group of atoms, other than a halogen, within a compound that is capable of reacting with a reactive functional group on another compound. Examples of reactive functional groups include epoxide, hydroxidehydroxyl, thiol, amino, urea, amide and/or carboxylic acid functional groups. As used herein, a "pendant" reactive functional group refers to a functional group of a polymer that is present as a side group to the polymeric backbone and does not form a terminus of the polymeric chain. As used herein, a "terminal" reactive function group refers to a functional group of a polymer that is not pendant to the polymeric backbone of the polymer and forms a terminus of the polymeric chain. As used herein, the term "halogen" refers to any of the elements fluorine, chlorine, bromine, iodine, and astatine corresponding to Group VIIA of the CAS version of the Periodic Table of the Elements. As used herein, the term "substantially free," "essentially free," or "completely free," when used with respect to the presence of reactive functional groups on the fluoropolymer, means that the reactive functional group is present in an amount of 1% or less, 0.1% or less, or 0.00% or less, respectively, the percentage based upon the total weight of reactive functional groups present relative to the total weight of the fluoropolymer.

In an example, the fluoropolymer may have the following structure and may comprise a fluoropolymer wherein at least one of the monomeric subunits contains a fluorine atom. For example, the fluoropolymer may have the following structure:

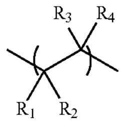

wherein at least one of $R_1$ to $R_4$ is a fluorine atom and the remaining $R_1$ to $R_4$ is a hydrogen, a halogen or a combination thereof. A suitable example of such fluoropolymers includes a homopolymer or copolymer containing the following monomeric subunit shown below known as polyvinylidene fluoride (PVDF) (available as Kynar PG-11):

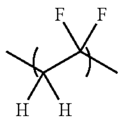

The fluoropolymer may be present in the curable composition in an amount of at least 1 percent by weight based on total weight of the curable composition, such as at least 10 percent by weight, and in some instances may be present in an amount of no more than 50 percent by weight based on total weight of the curable composition, such as no more than 41 percent by weight. The fluoropolymer may be present in the curable composition in an amount of 1 percent by weight to 50 percent by weight based on total weight of the curable composition, such as 10 percent by weight to 41 percent by weight.

According to the present invention, the curable composition optionally may further comprise an accelerator. The accelerator may be latent, blocked, encapsulated, or combinations thereof.

Useful accelerators may comprise amidoamine or polyamide catalysts, such as, for example, one of the Ancamide® products available from Air Products, amine, dihydrazide, or dicyandiamide adducts and complexes, such as, for example, one of the Ajicure® products available from Ajinomoto Fine Techno Company, 3,4-dichlorophenyl-N,N-dimethylurea (A.K.A. Diuron) available from Alz Chem, or combinations thereof.

According to the present invention, when utilized, the accelerator may be present in the curable composition in an amount of at least 0.01 percent by weight based on the total composition weight, such as at least 0.05 percent by weight, such as at least 0.5 percent by weight and in some cases may be present in the curable composition in an amount of no more than 10 percent by weight based on the total composition weight, such as no more than 5 percent by weight, such as no more than 3 percent by weight. According to the present invention, when utilized, the accelerator may be present in the curable composition in an amount from 0.01 percent by weight to 10 percent by weight based on the total composition weight, such as from 0.05 percent by weight to 5 percent by weight, such as from 0.5 percent by weight to 3 percent by weight.

Optionally, the curable composition according to the present invention may further comprise elastomeric particles. As used herein, "elastomeric particles" refers to particles comprised of one or more materials having at least one glass transition temperature (Tg) of greater than −150° C. and less than 30° C., calculated, for example, using the Fox Equation. The elastomeric particles may be phase-separated from the epoxy-containing component. As used herein, the term "phase-separated" means forming a discrete domain within a matrix of the epoxy-containing component.

The elastomeric particles may have a core/shell structure. Suitable core-shell elastomeric particles may be comprised of an acrylic shell and an elastomeric core. The core may comprise natural or synthetic rubbers, polybutadiene, styrene-butadiene, polyisoprene, chloroprene, acrylonitrile butadiene, butyl rubber, polysiloxane, polysulfide, ethylene-vinyl acetate, fluoroelastomer, polyolefin, or combinations thereof.

According to the present invention, the average particle size of the elastomeric particles may be at least 20 nm, as measured by transmission electron microscopy (TEM), such as at least 30 nm, such as at least 40 nm, such as at least 50 nm, and may be no more than 1,000 nm, such as no more than 700 nm, such as no more than 500 nm, such as no more than 300 nm. According to the present invention, the average particle size of the elastomeric particles may be 20 nm to 1,000 nm as measured by TEM, such as 30 nm, to 700 nm, such as 40 nm to 500 nm, such as 50 nm to 300 nm. Suitable methods of measuring particle sizes by TEM include suspending elastomeric particles in a solvent selected such that the particles do not swell, and then drop casting the suspension onto a TEM grid which is allowed to dry under ambient conditions. For example, epoxy resin containing core-shell rubber elastomeric particles from Kaneka Texas Corporation can be diluted in butyl acetate for drop casting. Particle size measurements may be obtained from images acquired using a Tecnai T20 TEM operating at 200 kV and analyzed using ImageJ software, or an equivalent instrument and software.

According to the present invention, the elastomeric particles may optionally be included in an epoxy carrier resin for introduction into the curable composition. Suitable finely dispersed core-shell elastomeric particles in an average particle size ranging from 20 nm to 1,000 nm may be master-batched in epoxy resin such as aromatic epoxides, phenolic novolac epoxy resin, bisphenol A and/or bisphenol F diepoxide, and/or aliphatic epoxides, which include cycloaliphatic epoxides, at concentrations ranging from 1% to 80% core-shell elastomeric particles by weight based on the total weight of the elastomeric dispersion, such as from 5% to 50%, such as from 15% to 35%. Suitable epoxy resins may also include a mixture of epoxy resins. When utilized, the epoxy carrier resin may be an epoxy-containing component of the present invention such that the weight of the epoxy-containing component present in the curable composition includes the weight of the epoxy carrier resin.

Exemplary non-limiting commercial core-shell elastomeric particle products using poly(butadiene) rubber particles that may be utilized in the curable composition of the present invention include core-shell poly(butadiene) rubber powder (commercially available as PARALOID™ EXL 2650A from Dow Chemical), a core-shell poly(butadiene) rubber dispersion (25% core-shell rubber by weight) in bisphenol F diglycidyl ether (commercially available as Kane Ace MX 136), a core-shell poly(butadiene) rubber dispersion (33% core-shell rubber by weight) in Epon® 828 (commercially available as Kane Ace MX 153), a core-shell poly(butadiene) rubber dispersion (33% core-shell rubber by weight) in Epiclon® EXA-835LV (commercially available as Kane Ace MX 139), a core-shell poly(butadiene) rubber dispersion (37% core-shell rubber by weight) in bisphenol A diglycidyl ether (commercially available as Kane Ace MX 257), and a core-shell poly(butadiene) rubber dispersion (37% core-shell rubber by weight) in Epon® 863 (commercially available as Kane Ace MX 267), each available from Kaneka Texas Corporation.

Exemplary non-limiting commercial core-shell elastomeric particle products using styrene-butadiene rubber particles that may be utilized in the curable composition include a core-shell styrene-butadiene rubber powder (commercially available as CLEARSTRENGTH® XT100 from Arkema), core-shell styrene-butadiene rubber powder (commercially available as PARALOID™ EXL 2650J), a core-shell styrene-butadiene rubber dispersion (33% core-shell rubber by weight) in bisphenol A diglycidyl ether (commercially available as Fortegra™ 352 from Olin™), core-shell styrene-butadiene rubber dispersion (33% rubber by weight) in low viscosity bisphenol A diglycidyl ether (commercially available as Kane Ace MX 113), a core-shell styrene-butadiene rubber dispersion (25% core-shell rubber by weight) in bisphenol A diglycidyl ether (commercially available as Kane Ace MX 125), a core-shell styrene-butadiene rubber dispersion (25% core-shell rubber by weight) in bisphenol F diglycidyl ether (commercially available as Kane Ace MX 135), a core-shell styrene-butadiene rubber dispersion (25% core-shell rubber by weight) in D.E.N.™-438 phenolic novolac epoxy (commercially available as Kane Ace MX 215), a core-shell styrene-butadiene rubber dispersion (25% core-shell rubber by weight) in Araldite® MY-721 multi-functional epoxy (commercially available as Kane Ace MX 416), a core-shell styrene-butadiene rubber dispersion (25% core-shell rubber by weight) in MY-0510 multi-functional epoxy (commercially available as Kane Ace MX 451), a core-shell styrene-butadiene rubber dispersion (25% core-shell rubber by weight) in Syna Epoxy 21 Cyclo-aliphatic Epoxy from Synasia (commercially available as Kane Ace MX 551), and a core-shell styrene-butadiene rubber dispersion (25% core-shell rubber by weight) in polypropylene glycol (MW 400) (commercially available as Kane Ace MX 715), each available from Kaneka Texas Corporation.

Exemplary non-limiting commercial core-shell elastomeric particle products using polysiloxane rubber particles that may be utilized in the curable composition of the present invention include a core-shell polysiloxane rubber powder (commercially available as GENIOPERL® P52 from Wacker), a core-shell polysiloxane rubber dispersion (40% core-shell rubber by weight) in bisphenol A diglycidyl ether (commercially available as ALBIDUR® EP2240A from Evonik), a core-shell polysiloxane rubber dispersion (25% core-shell rubber by weight) in jER™828 (commercially available as Kane Ace MX 960), a core-shell polysiloxane rubber dispersion (25% core-shell rubber by weight) in Epon® 863 (commercially available as Kane Ace MX 965) each available from Kaneka Texas Corporation.

The elastomeric particles, if present at all, may be present in the curable composition in an amount of at least 1 percent by weight based on total weight of the curable composition, such as at least 3 percent by weight, such as at least 5 percent by weight, and in some cases may be present in the composition in an amount of no more than 40 percent by weight based on total weight of the curable composition, such as no more than 30 percent by weight, such as no more than 25 percent by weight. According to the present invention, the elastomeric particles may be present in the curable composition in an amount of 1 percent by weight to 40 percent by weight based on total weight of the curable composition, such as 3 percent by weight to 30 percent by weight, such as 5 percent by weight to 25 percent by weight.

According to the present invention, reinforcement fillers may optionally be added to the curable composition. Useful reinforcement fillers that may be introduced to the curable composition of the present invention to provide improved mechanical properties include fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength.

According to the present invention, organic and/or inorganic fillers, such as those that are substantially spherical, may optionally be added to the curable composition. Useful organic fillers that may be introduced include cellulose, starch, and acrylic. Useful inorganic fillers that may be introduced include borosilicate, aluminosilicate, and calcium carbonate. The organic and inorganic fillers may be solid, hollow, or layered in composition and may range in size from 10 nm to 1 mm in at least one dimension. As used herein, "spherical," when used with respect to a filler, means a filler having an aspect ratio (i.e., a ratio of width to height) of 1. As used herein, "substantially spherical" means having an aspect ratio of 1±0.2.

Optionally, according to the present invention, additional fillers, thixotropes, colorants, tints and/or other materials also may be added to the curable composition.

Useful thixotropes that may be used include untreated fumed silica and treated fumed silica, castor wax, clay, organo clay and combinations thereof. In addition, fibers such as synthetic fibers like Aramid® fiber and Kevlar® fiber, acrylic fibers, and/or engineered cellulose fiber may also be utilized.

Useful colorants, dyes, or tints may include red iron pigment, titanium dioxide, calcium carbonate, and phthalocyanine blue and combinations thereof.

Useful fillers that may be used in conjunction with thixotropes may include inorganic fillers such as inorganic clay or silica and combinations thereof.

Exemplary other materials that may be utilized include, for example, calcium oxide and carbon black and combinations thereof.

Such fillers, if present at all, may be present in an amount of no more than 40 percent by weight based on total weight of the composition, such as no more than 20 percent by weight, such as no more than 10 percent by weight. Such fillers, if present at all, may be present in an amount of 0.1 percent by weight to 40 percent by weight based on total weight of the composition, such as 1 percent by weight to 20 percent by weight, such as 2 percent by weight to 10 percent by weight.

Optionally, the composition may be substantially free, or essentially free, or completely free, of platy fillers such as mica, talc, pyrophyllite, chlorite, vermiculite, or combinations thereof.

Optionally, the curable composition may comprise an epoxy-containing component that is different than the epoxide-functional polymer. Useful epoxy-containing components include any of the epoxy-containing or epoxide-functional components described hereinabove.

The epoxy-containing component may be present in the curable composition in an amount of no more than 47 percent by weight based on total weight of the curable composition, such as no more than 35 percent by weight, such as no more than 20 percent by weight. Such epoxy-containing components, if present at all, may be present in the curable composition in an amount of 1 percent by weight to 47 percent by weight based on total weight of the curable composition, such as 2 percent by weight to 35 percent by weight, such as 5 percent by weight to 20 percent by weight.

Optionally, the composition may be substantially free, or essentially free, or completely free, of free radical initiators.

Optionally, the curable composition may be substantially free, or essentially free, or completely free, of organic solvent to provide low volatile organic emissions during application. As used herein, "substantially free of organic solvent" means that organic solvent may be present in the curable composition in an amount of less than 5 weight percent based on total weight of the curable composition. As used herein, "essentially free of organic solvent" means that organic solvent may be present in the curable composition in an amount of less than 2 weight percent based on total weight of the curable composition. As used herein, "completely free of organic solvent" means that organic solvent may be present in the curable composition in an amount of 0 weight percent based on total weight of the curable composition. It should be understood, however, that a small amount of organic solvent can be present in the curable composition, for example, to improve flow of the composition.

The curable composition of the present invention may be a solid at temperatures of less than 30° C. and may have a melting point of 30° C. to 150° C., such as 40° C. to 120° C., and may have a melting point that is at least 10° C. lower than the activation temperature of the curing agent, such as at least 20° C. lower, such as 30° C. lower.

A surface of a substrate may be at least partially coated with the curable composition of the present invention. Optionally, the substrate may be at least partially cured by an external energy source.

The curable composition may be a film, an embedding material, an encapsulating material, a potting material, a reactive hot melt, or the like, or combinations thereof, wherein the composition may be heated above its melting temperature and may be used to surround a substrate or assembly in order to substantially exclude air, water, and/or moisture from the substrate and/or to protect the substrate or assembly from vibration or impact, and/or to add strength or stiffness to the substrate or assembly. The curable composition optionally may be at least partially cured by an external energy source following the embedding, encapsulating, or potting processes.

The present invention also is directed to a method for treating a substrate comprising, or consisting essentially of, or consisting of, contacting at least a portion of a surface of the substrate with one of the curable compositions of the present invention described hereinabove. The composition may be cured to form a coating, layer or film on the substrate surface by exposure to an external energy source, as described herein. The coating, layer or film, or reactive hot melt may be an adhesive.

The present invention is also directed to a method for forming a bond between two substrates for a wide variety of potential applications in which the bond between the substrates provides particular mechanical properties related to lap shear strength. The method may comprise, or consist essentially of, or consist of, applying the composition described above to a first substrate; contacting a second substrate to the composition such that the composition is located between the first substrate and the second substrate; and curing the composition by exposure to an external energy source, as described herein. For example, the composition may be applied to either one or both of the substrate materials being bonded to form an adhesive bond therebetween and the substrates may be aligned and pressure and/or spacers may be added to control bond thickness. The composition may be applied to cleaned or uncleaned (i.e., including oily or oiled) substrate surfaces.

The composition described above may be applied alone or as part of a coating system that can be deposited in a number of different ways onto a number of different substrates. The system may comprise a number of the same or different layers and may further comprise other curable compositions such as pretreatment compositions, primers, and the like. A coating, film, layer or the like is typically formed when a composition that is deposited onto the substrate is at least partially cured by methods known to those of ordinary skill in the art (e.g., by exposure to thermal heating or actinic radiation).

The composition can be applied to the surface of a substrate in any number of different ways, non-limiting examples of which include brushes, rollers, films, pellets, pressure injectors, spray guns and applicator guns, including hot melt guns.

The present invention also is directed to methods of making an adhesive film or a reactive hot melt comprising: heating a curable composition of the present invention to at least the melt temperature of the curable composition and below the activation temperature of the curing agent; casting the curable composition into a film or a mold; and cooling the casted curable composition to a temperature below the melt temperature, i.e., the composition may be applied by a hot melt application. The film may be applied to a substrate surface or the hot melt may be extruded and applied to a substrate surface and a second substrate may be applied such that the film or the extruded hot melt, as the case may be, is positioned between the two substrates. The curable composition may be at least partially cured by activating the curing agent as described above. Any method of casting or extruding known to those skilled in the art may be used with the present invention.

In examples, after application to the substrate, the composition can be cured to form a coating, layer or film, such as using an external energy source such as an oven or other thermal means or through the use of actinic radiation. For example, the composition can be cured by baking and/or curing at elevated temperature, such as at a temperature of at least 80° C., such as at least 100° C., such as at least 120° C., such as at least 125° C., such as at least 130° C., such as at least 150° C., and in some cases at a temperature of no more than 350° C., such as no more than 275° C., such as no more than 210° C., such as no more than 190° C., and in some cases at a temperature of from 80° C. to 350° C., from 120° C. to 275° C., from 125° C. to 210° C., from 130° C. to 190° C., and for any desired time period (e.g., from 5 minutes to 5 hours) sufficient to at least partially cure the curable composition on the substrate(s). The skilled person understands, however, that the time of curing varies with temperature. The coating, layer or film, may be, for example, an adhesive, as described above.

As stated above, the present disclosure is directed to curable compositions that are used to bond together two substrate materials for a wide variety of potential applications in which the bond between the substrate materials provides particular mechanical properties related to combined lap shear strength and displacement. The curable composition may be applied to either one or both of the substrate materials being bonded such as, by way of non-limiting example, components of a vehicle. The pieces may be aligned and pressure and/or spacers may be added to control bond thickness.

It has been surprisingly discovered that the compositions of the present invention have the ability to be applied as a film composition and, following hot melt application, produce a load-bearing joint having a lap shear strength of at least 0.5 MPa as determined according to ASTM D1002-10 using 6022-T43 aluminum substrate of 0.89 mm thickness as measured by an INSTRON 5567 machine in tensile mode with a pull rate of 1.3 mm per minute, while also producing a load-bearing joint having a lap shear of greater than 15.0 MPa following baking at a temperature of at least 150° C. for at least 1 minute measured according to ASTM D1002-10 using 6022-T43 aluminum substrate of 0.89 mm thickness as measured by an INSTRON 5567 machine in tensile mode with a pull rate of 1.3 mm per minute.

The substrates that may be coated by the compositions of the present invention are not limited. Suitable substrates useful in the present invention include, but are not limited to, materials such as metals or metal alloys, ceramic materials such as boron carbide or silicon carbide, polymeric materials such as hard plastics including filled and unfilled thermoplastic materials or thermoset materials, or composite materials. Other suitable substrates useful in the present invention include, but are not limited to, glass or natural materials such as wood. For example, suitable substrates include rigid metal substrates such as ferrous metals, aluminum, aluminum alloys, magnesium titanium, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 1XXX, 2XXX, 3XXX, 4XXX, 5XXX, 6XXX, 7XXX, or 8XXX series as well as clad aluminum alloys and cast aluminum alloys of the A356, 1XX.X, 2XX.X, 3XX.X, 4XX.X, 5XX.X, 6XX.X, 7XX.X, or 8XX.X series also may be used as the substrate. Magnesium alloys of the AZ31B, AZ91C, AM60B, or EV31A series also may be used as the substrate. The substrate used in the present invention may also comprise titanium and/or titanium alloys of grades 1-36 including H grade variants. Other suitable non-ferrous metals include copper and magnesium, as well as alloys of these materials. Suitable metal substrates for use in the present invention include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091. The substrate may comprise a fibrous material, a sheet, or a mesh, including comprising carbon fibers, glass fibers, and/or nylon and may be at least partially embedded in the curable composition. The substrate may comprise a composite material such as a plastic or a fiberglass composite. The substrate may be a fiberglass and/or carbon fiber composite. The compositions of the present invention are particularly suitable for use in various industrial or transportation applications including automotive, light and heavy commercial vehicles, marine, or aerospace.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Illustrating the invention are the following examples that are not to be considered as limiting the invention to their details. All parts and percentages in the examples, as well as throughout the specification, are by weight unless otherwise indicated.

Examples

Synthesis

Ingredients used to make epoxide-functional polymers EFP-A are shown in Table 1. The polyisocyanate component and the resin diluent component were added to a 1 L round bottom flask under constant stirring. Then, 0.003 percent by weight based on total weight of the composition dibutyltin dilaurate catalyst was added and the mixture was heated to 80° C. Then, the polyol/polyamine component was added dropwise and the mixture was stirred at 80° C. for 2 hours. The mixture then was cooled to 60° C. and the epoxide component was fed over the course of 60 minutes. The mixture was stirred until the isocyanate peak was no longer visible by infrared spectroscopy. The mixture then was heated to ≥80° C. to pour epoxide-functional polymer from flask. The amounts of each component used (% by weight) are shown in Table 1. Table 1 also reports the theoretical epoxy equivalent weight as well as the weight-average molecular weight and polydispersity index measured by Gel Permeation Chromatography of the polymer dissolved in tetrahydrofuran.

Lap shear specimens were prepared according to ASTM D1002-10. The substrate used was 6022-T43 aluminum alloy panels measuring 25.4 mm×101.6 mm×0.8 mm cleaned with ChemKleen 490MX (an alkaline cleaning solution available from PPG Industries, Inc., Cleveland, OH). Compositions A through C were heated to 93° C. and then applied while hot to one end of a panel covering the full 25.4 mm width and ≥12.7 mm from one end. A second cleaned aluminum panel was then placed over the composition layer in an end-to-end fashion, resulting in a bonded area of 25.4 mm×12.7 mm. Lap joints were secured with metal clips and allowed to sit for 24 hours at ambient laboratory temperature or baked at 160° C. for 90 minutes and allowed to rest overnight before testing.

TABLE 2

| Examples | Composition B Wt. (g) | Composition C Wt. (g) |
|---|---|---|
| Composition A | 10.0 | 10.0 |
| TOYO-TAC ® PMA-LE [1] | 0.5 | — |
| Kynar PG-11[2] | — | 4.2 |
| Total weight | 10.5 | 14.2 |

[1] Polyolefin grafted with maleic anyhydride available from TOYOBO
[2] Polyvinylidene difluoride PVDF available from Arkema The lap joint specimens were tested using an INSTRON 5567 machine in tensile mode with a gauge gap of 114.3 mm and a pull rate of 1.3 mm per minute for green strength and 10 mm per minute for full bake specimens. Lap shear results are presented in Table 3.

TABLE 1

Composition and properties of synthesized polymers

| Epoxide-Functional Polymer (EFP) | Polyol/ polyamine (X) | Mw of component X | Wt % X[1] | Polyisocyanate (Y) | Wt % Y[1] | Epoxide (Z) | Wt % Z[1] | Resin Diluent | Wt % Resin Diluent | EEW[6] | Mw[7] |
|---|---|---|---|---|---|---|---|---|---|---|---|
| EFP-A | PEG[2] | 250 | 22.93 | HDI[3] | 30.85 | Glycidol[4] | 11.72 | Epon 828[5] | 34.49 | 287[8] | 3244 |

[1] Based on total weight of the composition
[2] Polyether glycol available from The LYCRA Company
[3] Hexamethylene diisocyanate available from Covestro
[4] Available from Sigma-Aldrich
[5] Available from Hexion
[6] Epoxy equivalent weight measured by titration with 0.1N perchloric acid in glacial acetic acid on a Metrohm 888 Titrando
[7] Weight-average molecular weight
[8] Theoretical epoxy equivalent weight

Formulation

Compositions were prepared as described below and in Table 2. All compositions were prepared at an amine-hydrogen to epoxy equivalence ratio of 1:1 using the theoretical epoxy equivalent weight given in Table 1. Composition A was prepared by heating 33.0 grams of EFP-A, 2.2 grams of dicyandiamide (Dyhard 100SF, available from AlzChem), and 0.35 grams of 250 micron Spheriglass® glass beads (available from Potters Industries) in an oven at 93° C. and then mixing for a total of four minutes using a dual asymmetric centrifugal SpeedMixer™ at the rate of 2350 rpm under laboratory ambient temperature (23° C.). Additives were then mixed with Composition A at the ratios given in Table 2. To mix, Composition A and the additive were heated in an oven at 93° C. and mixed on a SpeedMixer™ as described above.

TABLE 3

Lap Joint Performance of Examples on ChemKleen 490MX 6022 Aluminum

| Composition | A | B | C |
|---|---|---|---|
| Lap Shear Green Strength (MPa) | 0.38 ± 0.01 | 0.42 ± 0.08 | 0.92 ± 0.09 |
| Lap Shear Full Bake Strength (MPa) | 19.9 ± 0.7 | 19.8 ± 0.1 | 19.4 ± 0.1 |

The data from Table 3 demonstrates the effect of including a fluoropolymer in the composition of the present invention (Composition C) on green strength compared to Composition A and Composition B (which included an anhydride-grafted polyolefin). The full bake performance of the compositions was comparable.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. A curable composition comprising:

an epoxide-functional polymer comprising an epoxide-functional polyurethane comprising a di-isocyanate;

a curing agent capable of reacting with the epoxide-functional polymer that is activatable by an external energy source; and a fluoropolymer that is substantially free of a reactive functional group.

2. The curable composition of claim 1, wherein the epoxide-functional polymer comprises a solid at less than 30° C.

3. The curable composition of claim 1, wherein the curable composition comprises a melting point of 30° C. to 150° C.

4. The curable composition of claim 1, wherein the fluoropolymer comprises a homopolymer.

5. The curable composition of claim 1, wherein the fluoropolymer comprises the structure:

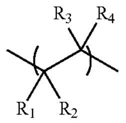

wherein at least one of $R_1$ to $R_4$ is a fluorine atom and the remaining $R_1$ to $R_4$ is a hydrogen, a halogen or a combination thereof.

6. The curable composition of claim 1, wherein the fluoropolymer comprises a homopolymer or copolymer of polyvinylidene fluoride.

7. The curable composition of claim 1, wherein:

(a) the epoxide-functional polymer is present in an amount of 20 percent by weight to 98 percent by weight based on total weight of the curable composition;

(b) the curing agent is present in an amount of 1 percent by weight to 30 percent by weight based on total weight of the curable composition;

(c) the fluoropolymer is present in an amount of 1 percent by weight to 50 percent by weight based on total weight of the curable composition; and/or (d) is substantially free of solvent.

8. The curable composition of claim 1, wherein the curable composition comprises a film, an embedding material, an encapsulating material, a potting compound, a reactive hotmelt, or combinations thereof.

9. An article, comprising:

a first substrate; and the curable composition of claim 1 on at least a portion of a surface of the first substrate.

10. The article of claim 9, further comprising a second substrate, wherein the curable composition is positioned between the first substrate and the second substrate.

11. The article of claim 9, wherein the curable composition (i) following hot melt application, produces a load-bearing joint having a lap shear green strength of at least 0.5 MPa as determined according to ASTM D1002-10 using 6022-T43 aluminum substrate of 0.89 mm thickness as measured by an INSTRON 5567 machine in tensile mode with a pull rate of 1.3 mm per minute and/or (ii) produces a load-bearing joint having a lap shear of greater than 15.0 MPa following baking at a temperature of at least 150° C. for at least 1 minute measured according to ASTM D1002-10 using 6022-T43 aluminum substrate of 0.89 mm thickness as measured by an INSTRON 5567 machine in tensile mode with a pull rate of 1.3 mm per minute.

12. A method for forming an adhesive on a substrate surface comprising:

applying the composition of claim 1 to a surface of a first substrate;

contacting a surface of a second substrate to the composition such that the composition is located between the first substrate and the second substrate; and applying an external energy source to at least partially cure the composition.

13. A substrate, wherein a surface of the substrate is at least partially coated with and/or encapsulated in the curable composition of claim 1.

14. A film formed from the composition of claim 1 on at least a portion of a substrate surface, wherein the film, (i) following hot melt application, produces a load-bearing joint having a lap shear green strength of at least 0.5 MPa as determined according to ASTM D1002-10 using 6022-T43 aluminum substrate of 0.89 mm thickness as measured by an INSTRON 5567 machine in tensile mode with a pull rate of 1.3 mm per minute and/or (ii) produces a load-bearing joint having a lap shear of greater than 15.0 MPa following baking at a temperature of at least 150° C. for at least 1 minute measured according to ASTM D1002-10 using 6022-T43 aluminum substrate of 0.89 thickness as measured by an INSTRON 5567 machine in tensile mode with a pull rate of 1.3 mm per minute.

15. The substrate of claim 13, wherein the curable composition (i) following hot melt application, produces a load-bearing joint having a lap shear green strength of at least 0.5 MPa as determined according to ASTM D1002-10 using 6022-T43 aluminum substrate of 0.89 mm thickness as measured by an INSTRON 5567 machine in tensile mode with a pull rate of 1.3 mm per minute and/or (ii) produces a load-bearing joint having a lap shear of greater than 15.0 MPa following baking at a temperature of at least 150° C. for at least 1 minute measured according to ASTM D1002-10 using 6022-T43 aluminum substrate of 0.89 thickness as measured by an INSTRON 5567 machine in tensile mode with a pull rate of 1.3 mm per minute.

16. A curable composition comprising:

an epoxide-functional polymer;

a curing agent capable of reacting with the epoxide-functional polymer that is activatable by an external energy source; and a fluoropolymer that is substantially free of a reactive functional group, wherein the epoxide-functional polymer:

comprises a reaction product of reactants comprising an isocyanate-functional prepolymer and an epoxide functional compound;

comprises hydroxyl-functionality;

is substantially free of unreacted isocyanate functional groups; and/or comprises a melting point that is at least 10° C. lower than a temperature at which the curing agent is activated.

17. A curable composition comprising:

an epoxide-functional polymer;

a curing agent capable of reacting with the epoxide-functional polymer that is activatable by an external energy source;

a fluoropolymer that is substantially free of a reactive functional group, and elastomeric particles, at least one filler material, an epoxy-containing component that is different from the epoxide-functional polymer and/or an accelerator.

18. The curable composition of claim 16, wherein the isocyanate-functional prepolymer comprises a reaction product of reactants comprising a polyol and a polyisocyanate and/or a reaction product of a polyamine and a polyisocyanate.

19. The curable composition of claim 17, wherein:

(a) the elastomeric particles are present in an amount of no more than 40 percent by weight based on total weight of the curable composition;

(b) the filler material is present in an amount of no more than 40 percent by weight based on total weight of the curable composition;

(c) the epoxy-containing component that is different from the epoxide-functional polymer is present in an amount of no more than 47 percent by weight based on total weight of the curable composition and/or has an average epoxide functionality of greater than 1.0 to 4.0; and/or (d) the accelerator is present in an amount of no more than 10 percent by weight based on total weight of the curable composition.

* * * * *